United States Patent [19]

Jeon

[11] Patent Number: 5,249,057
[45] Date of Patent: Sep. 28, 1993

[54] AUTOMATIC CENTERFOCUS CONTROL CIRCUIT OF A VIDEO APPARATUS

[75] Inventor: Il-Joong Jeon, Suweon, Rep. of Korea

[73] Assignee: SamSung Electronics Co., Ltd., Suwon, Rep. of Korea

[21] Appl. No.: 755,865

[22] Filed: Sep. 6, 1991

[30] Foreign Application Priority Data

Sep. 12, 1990 [KR] Rep. of Korea ............. 90-14074

[51] Int. Cl.$^5$ ............. H04N 5/232; H04N 5/238
[52] U.S. Cl. ............. 358/227; 358/228
[58] Field of Search ............. 358/213.15, 213.19, 358/227, 228, 174

[56] References Cited

U.S. PATENT DOCUMENTS

| | | | |
|---|---|---|---|
| 4,495,520 | 1/1985 | Kravitz et al. | 358/174 |
| 4,660,092 | 4/1987 | Nutting | 358/224 |
| 4,739,409 | 4/1988 | Baumeister | 358/213.16 |
| 4,825,293 | 4/1989 | Kobayashi et al. | 358/213.19 |
| 4,879,600 | 11/1989 | Ise et al. | 358/213.19 |
| 4,972,266 | 11/1990 | Tani | 358/213.19 |
| 5,008,757 | 4/1991 | Kimura et al. | 358/213.19 |

Primary Examiner—Michael T. Razavi
Assistant Examiner—Joseph V. Colaianni
Attorney, Agent, or Firm—Robert E. Bushnell

[57] ABSTRACT

An automatic control circuit of the depth of focus of a video shooting apparatus for automatically controlling the depth of focus in control of a shutter speed on centerfocusing comprises a switch for switching on the state of the established centerfocus if a control command of centerfocus is applied by a user, a microcomputer for outputting the control signal of the shutter speed to a shutter selector if the state of the established centerfocus is received, a sample and hold circuit for sampling and holding an image signal of an image element controlled by the shutter speed selected from the shutter selector, and a level detection for detector the level of the shutter speed provided by the sample and hold circuit to control the operation of the microcomputer.

6 Claims, 2 Drawing Sheets

AUTOMATIC CENTERFOCUS CONTROL CIRCUIT OF A VIDEO APPARATUS

BACKGROUND OF THE INVENTION

1. Field of the Invention

The present invention relates generally to an automatic control circuit for controlling the depth of focus of a video shooting apparatus and, more particularly to an automatic control circuit for controlling the depth of focus by automatically controlling the quantity of light of an object in dependence upon a shutter speed for a special-shooting.

2. Description of the Prior Art

In general, video shooting apparatuses are camcorders or video camera, electronic still camera etc. Particularly, a video camera is a device for converting an image of an object (scenery, figure etc.) into an electrical signal (an image signal) and is called a TV camera or a telecamera. If a person shoots an object by such a video camera, at first, an image is electrically converted from an image element and is output through a sample and hold circuit to provide a peak value or an average value to be applied to an iris detector for controlling the opening and closing of an iris of lens in dependence upon an incidence of the suitable quantities of light to a camera according to the state of light quantities (illuminance; Lux). The depth of focus is determined according to the degree of the opening and closing of such iris. The depth of focus is used to adjust a focal point by moving a focal plane in the front and rear directions within an option distance without moving the position of an object. Accordingly, the more the iris of lens is tighten, the more the depth of focus is deepened. Then, as the depth of focus is equal to the depth of background within a constant distance centering on an object as well as an object, in a conventional art, the depth of focus has been controlled by attaching a centerfocus optical filter to the front plane of lens on special-shooting such as a centerfocus centering on an object. Therefore, it is a tremendous convenience to a user since the conventional art requires that the centerfocus optical filter to be attached every time a centerfocus is desired.

SUMMARY OF THE INVENTION

The present invention is designed to provide a circuit for automatically controlling the depth of focus on centerfocus shooting by full-opening an iris and adjusting the quantity of light of an object in control of a shutter speed in dependence upon the condition of the depth of focus of an entire shooting screen.

Accordingly, the present invention directs to an automatic control circuit of the depth of focus of a video shooting apparatus composed of an image element for converting to an image signal an optical image of an object formed through a lens, and a shutter selector for selecting a shutter speed, a selecting switch of centerfocus for switching if a control command of centerfocus is applied by an user external signal; a microcomputer for providing a control signal of the shutter speed to the shutter selector if a control signal of centerfocus is applied through the selecting switch; a sample and hold circuit connected to an output terminal of the image elements for sampling and holding if an image output signal of the image element is applied, in dependence upon the shutter speed selected from said shutter selector connected to an output terminal of the sample and hold circuit, a switch for switching according to a control state of the selecting switch of said center focus; and a level detector for receiving and integrating the output signal of the sample and hold circuit, and then, comparing to a reference signal to provide a shutter control signal to a control input terminal of the microcomputer to control a selection of the shutter speed.

To above object and other objects and advantages of the present invention will become apparent from the detailed description to follow, taken in connection with the appended drawings.

DESCRIPTION OF THE PREFERRED EMBODIMENT

Figure 1:
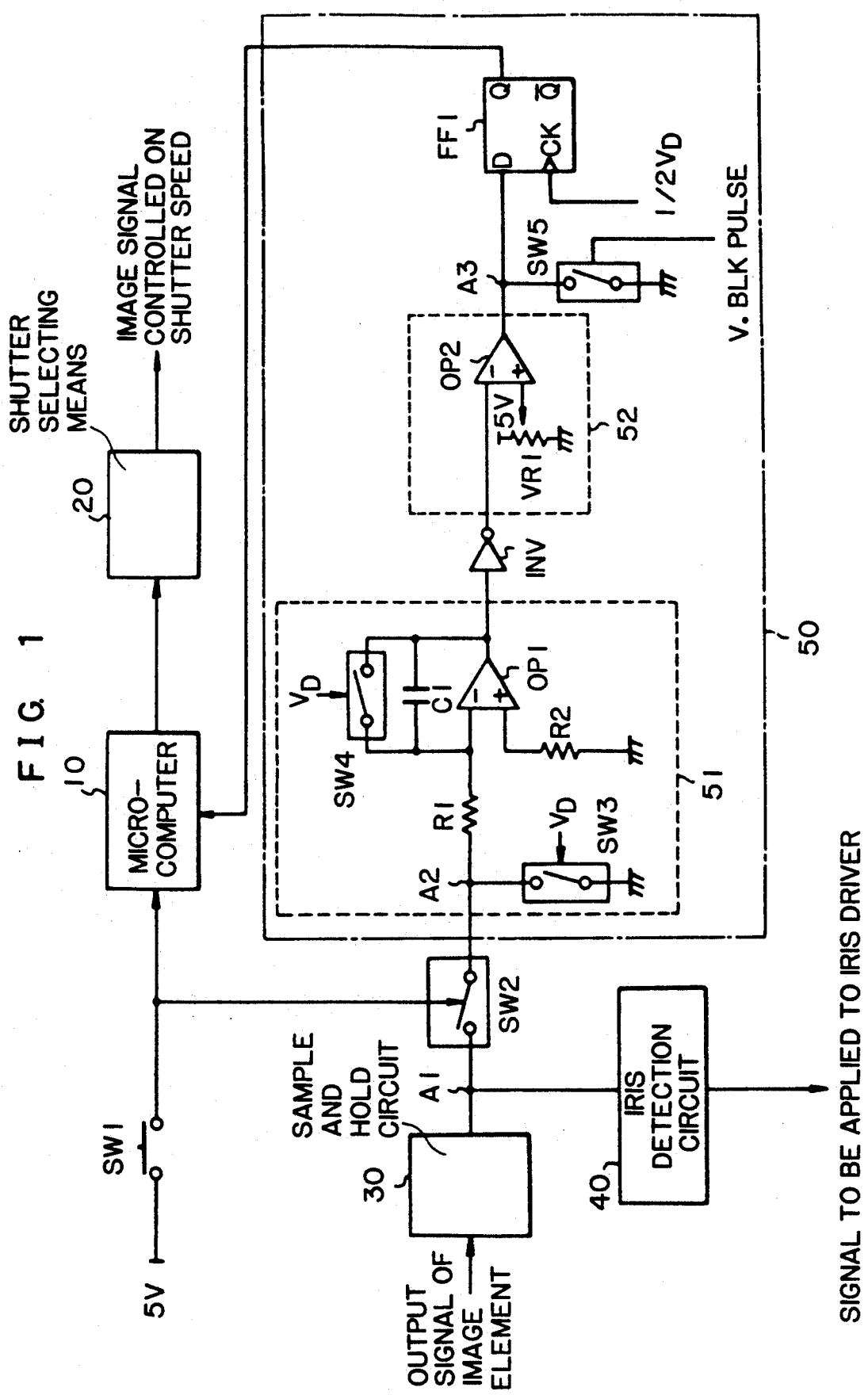
FIG. 1 is an embodiment of an automatic control circuit for controlling the depth of focus according to the present invention.

Referring now to the drawings, FIG. 1 according to the present invention is an automatic control circuit diagram of the depth of focus on centerfocusing for a video shooting apparatus composed of an image element and a shutter selector.

The construction of an automatic control circuit is as follows.

A switch SW1 is constructed to switch if a centerfocus selecting signal is applied by an external signal. A microcomputer 10 is constructed to control an entire system. A sample and hold circuit 30 is constructed to sample and hold an image signal applied from an output terminal of an image element.

An iris detection circuit 40 is constructed to control the state of iris by an output signal of the sample and hold circuit 30 and connected between the sample and hold circuit 30 and an iris driver (not shown in the drawing).

An image signal level detector 50 comprises: an integrator 51 composed of a switch SW3 switched every 1 vertical period $V_D$ between a connection point A2 and the lowest potential GND to obtain an average value of output signals of said sample and hold circuit 30 every 1 vertical period (1 field), an operational amplifier OP1, a resistor R1 connected between said connection point A2 and an inverting input terminal of the operational amplifier OP1, a resistor R2 connected between the lowest potential GND and a non-inverting input terminal of the operational amplifier OP1, a condenser C1 connected between the inverting input terminal and an output terminal of the operational amplifier OP1, and a switch SW3 for switching every 1 vertical period connected in parallel; an inverter INV connected to an output terminal of the integrator 51; a comparator 52 constructed to connect an operational amplifier OP2 connecting an inverting terminal to an output terminal of the inverter INV, and the signal controlled from a variable resistor VR1 to a non-inverting terminal of the operational amplifier OP2; a flip-flop FF1 constructed in D flip-flop by connecting a non-inversion, output terminal Q to a control terminal of the shutter speed of a microcomputer 10 and said input terminal D to an output terminal of the comparator 52; and a switch SW5 switched every time when a vertical blanking signal is applied and connected between the lowest potential GND and a connection point A3 located between the flip-flop and the comparator 52.

Figure 2:
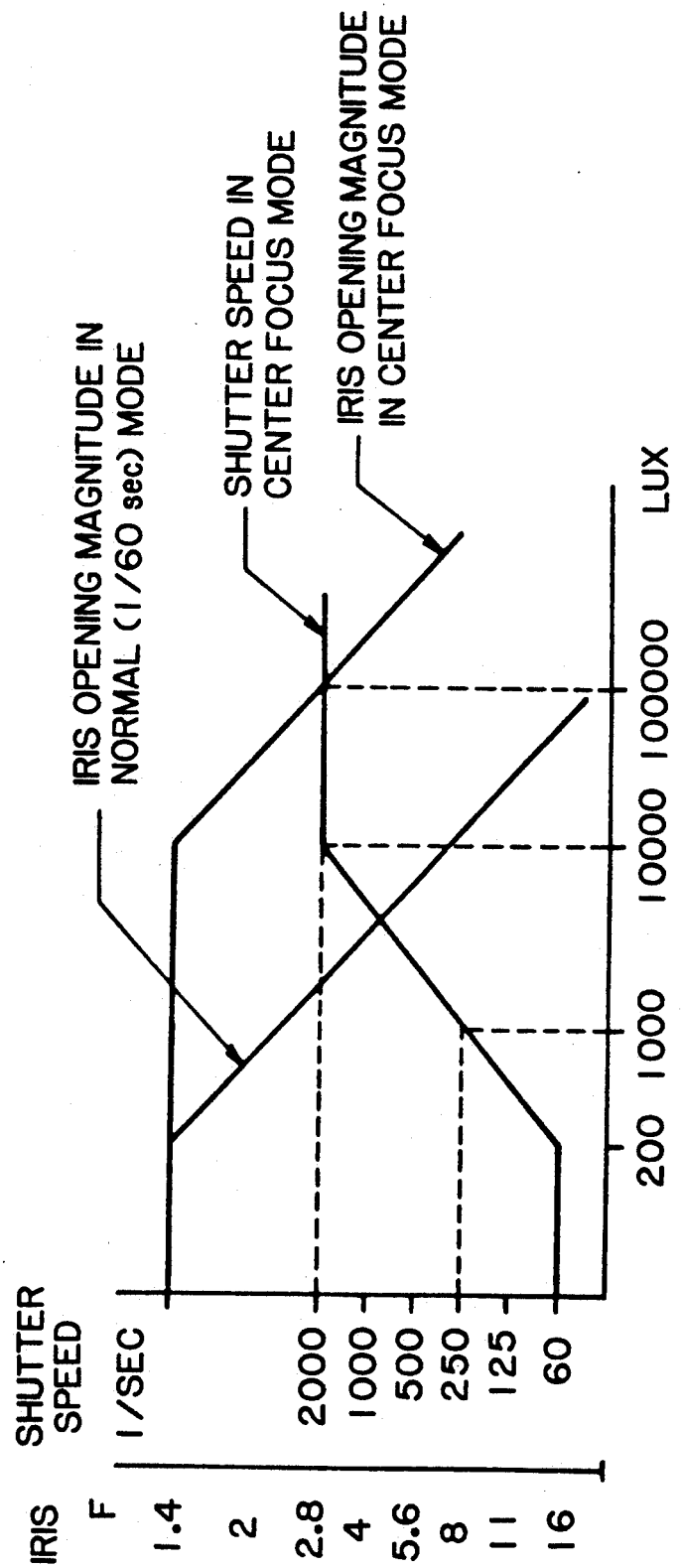
FIG. 2 is a characteristic graph of shutter speed and iris according to FIG. 1.

FIG. 2 is a characteristic graph of the iris and the shutter speed according to FIG. 1.

The operation of FIG. 1 will be explained in detail with reference to FIG. 2.

At first, a microcomputer 10 is set so that an initial output value to the shutter speed can be at 1/2000 sec, an iris is full-open. The 1/2000 sec is a maximum value of the shutter speed of the present invention as shown in FIG. 2. If the selecting switch SW1 turns on for centerfocus shooting by a user, the centerfocus control signal is applied to the microcomputer 10. As described above, the microcomputer 10 in response to the centerfocus control signal, provides shutter control signals to a shutter selector 20 so that the shutter speed of 1/2000 sec can be selected by the shutter selector 20. The shutter selector 20 outputs an image signal for controlling the shutter speed of 1/2000 sec through a sample and hold circuit 30 in dependence upon an image element on the shutter speed of the selected 1/2000 sec. The image signal holded and sampled from the sample and hold circuit 30 is applied to an iris detection circuit 40 and one side terminal of the switch SW2.

The iris detection circuit 40 doesn't make any special operations because the iris detection circuit outputs the control signals in order to operate an iris driver (not shown in the drawings) in the direction of an iris, and to detect and compensate the over-exposed light quantities only when the incident light quantity is above 10,000 Lux.

The switch SW2 automatically operates according to the switching operation of the switch SW1.

An integrator 51 integrates every 1 vertical period of an vertical synchronizing signal generated from a synchronizing signal generator (not shown in the drawings), if an output signal of the sample and hold circuit 30 is applied to the image signal level detector 50 through the switch SW2. An image signal of the integrated DC level is inverted through an inverter INV; and then if the inverted signal is applied to a non-inverting input terminal of a comparator 52, the comparator 52 compares the inverted signal to reference voltage level established by a variable resistor VR1 and discriminates whether or not the current signal level carries proper quantities of light and applies the result to an input terminal of a flip-flop FF1. Then, the output of the comparator 52 is a high logic signal if the image signal level is lower than the reference voltage level, and a low logic signal if the image signal level is at a proper level. The flip-flop FF1 is a D flip-flop used to received at a clock terminal a clock signal having a clock period of ½ vertical period and transmit the signal applied to the input terminal D through a buffer action to the microcomputer 10. That is to say, if the signal applied to the input terminal D of the D flip-flop is a high logic signal, a high logic signal is provided at an output terminal of the D flip-flop. On the other hand, if the signal is a low logic signal, a low logic signal is outputted. When a low logic signal is applied to the microcomputer 10, the microcomputer 10 outputs the control signals for selecting a shutter mode of 1/2000 sec as an initial mode set just as it is, and for selecting a mode downing the shutter speed when a high logic signal is applied to the microcomputer 10. If said mode downed is selected, said microcomputer 10 discriminates whether or not the mode is suitable for the image signal level detector 50 by repeating the aforementioned process, and then to continuously reduce the shutter speed till at least 1/60 sec of normal state when the applied image signal level is lower than the reference voltage level. However, during a vertical blanking pulse of a switch SW5, a low logic signal is applied to an input terminal D of D flip-flop so as to enable transmission of the low logic signal and to continuously prevent a high logic signal from applying to the microcomputer 10.

The aforementioned operation process of FIG. 1 will be described with examples as follows. In a case there the shutter speed is established on 1/2000 sec as described above and the incident light quantity is 10,000 Lux under a fullopening state of an iris, the output of image signal level detector 50 is a low logic signal and an image signal of centerfocus having a proper depth of focus is reappeared as the condition to indicate that a proper image signal level is produced. In another case where the incident illuminance is 1,000 Lux, and an image signal is darker than 10,000 Lux, the output of the comparator 52 in the image signal level detector 50 is a high logic signal. Accordingly, the microcomputer 10 starts to decrease the shutter speed if the signal applied to the microcomputer 10 is a high logic signal. That is to say, an initial setting shutter speed is usually at 1/2000 sec as shown in FIG. 2, if once a high logic signal is applied, the shutter speed is decrease to 1/1000 sec. Continuously, as an image signal level is not suitable, the shutter speed is down to 1/500 sec by applying a high logic signal to the microcomputer 10. However, in case that 1,000 Lux of illuminance is applied as shown in FIG. 2, as the shutter speed must be selected on a 1/250 sec mode, the aforementioned process is repeated until the 1/250 sec mode is selected. If the 1/250 sec mode is selected, the image signal level detector 50 outputs a low logic signal to the microcomputer 10.

In yet another case where the incident illuminance is 100,000 Lux, it is impossible to control the depth of focus by increasing the shutter speed as the shutter speed is fixed on the maximum 1/2000 sec.

Accordingly, as shown in FIG. 2 the iris is closed to 2.8 F. from the full-opening state of 1.4 F. ratio of lens) through the iris detection circuit 40, is reappeared an image signal having a proper depth of focus compensated by over-exposure light quantity.

As described above, for a video shooting apparatus as the present invention is to control the depth of focus for automatically controlling of the shutter speed on a special shooting such as a shooting based on the difference between the depth of focus of the periphery background and an object, the invention has a great advantage in that a conventional optical filter is no longer required in case of a special shooting.

It is thought that the present invention and many of its attendant advantages will be understood from the foregoing description; and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An automatic control circuit for controlling a centerfocus of an object, said automatic control circuit comprising:
   a first switch for enabling transmission of a control signal representative of said centerfocus;
   a microcomputer for controlling a selection of a shutter speed in dependence upon said control signal representative of said centerfocus;

a sample and hold circuit providing a sample-and-hold signal by sampling and holding an image signal in dependence upon the selected shutter speed;

a second switch for enabling transmission of said sampled-and-hold signal in dependence upon said control signal representative of said centerfocus; and level detection means for providing a shutter selecting signal to said microcomputer for controlling said selection of said shutter speed by integrating the sampled-and-hold signal of said sample and hold circuit, and then comparing said integrated signal to a reference signal.

2. The automatic control circuit as recited in claim 1, wherein said level detection means comprises:

an integrator providing said integrated signal by integrating the sampled-and-hold signal in dependence upon a vertical synchronizing signal;

an inverter providing an inverted signal by inverting said integrated signal of said integrator;

a comparator providing a compared signal by comparing said inverted signal of said inverter to said reference signal;

a buffer providing a buffered signal by buffering said compared signal of said comparator; and a switch enabling transmission of said buffered signal of said buffer in dependence upon a vertical blanking pulse.

3. An automatic control circuit for controlling a centerfocus of a video camera, said automatic control circuit comprising:

means for receiving a centerfocus selecting signal from a user;

sample-and-hold means for providing a sampled signal by sampling and holding an image signal representative of an image having an illumination level from a lens;

switch means for transmitting said image signal in dependence upon said centerfocus selecting signal;

image detector means for providing a shutter adjusting signal representative of one of a high logic state and a low logic state by detecting an illumination level of said transmitted image signal;

microprocessor means comprising a plurality of f-stops representative of a depth of focus, and a plurality of corresponding shutter speeds, for selecting a shutter speed from said plurality of shutter speeds to control the illumination level of said image at said lens in dependence upon said shutter adjusting signal; and iris control means for automatically selecting one of said plurality of f-stops in response to said sampled signal when said microprocessor means has selected said shutter speed.

4. The automatic control circuit as claimed in claim 3, wherein said image detector means comprises:

integrator means for providing an integrated signal by integrating said sampled signal in dependence upon a vertical synchronizing signal;

inverter means for providing an inverted signal by inverting said integrated signal;

comparator means for providing a compared signal by comparing said inverted signal with a reference voltage signal;

means for grounding said compared signal in dependence upon a vertical blanking signal; and flip-flop means for providing said shutter adjusting signal representative of said one of said high logic state and said low logic state by delaying said compared signal by one-half of a period of said vertical synchronizing signal.

5. An automatic control circuit for controlling a centerfocus of a video camera, comprising:

means for receiving a centerfocus selecting signal from a user;

sample-and-hold means for generating a sampled signal by sampling and holding an image signal representative of an image having an illumination level from a lens;

switch means for transmitting said image signal in dependence upon said centerfocus selecting signal;

image detector means for providing a shutter adjusting signal representative of one of a high logic state and a low logic state by detecting an illumination level of said transmitted image signal;

processor means comprising a plurality of f-stops representative of a depth of focus, and a plurality of corresponding shutter speeds, for selecting a shutter speed from said plurality of shutter speeds in dependence upon said one of the high logic state and the low logic state of said shutter adjusting signal; and iris control means for automatically selecting one of said plurality of f-stops in response to said sampled signal.

6. The automatic control circuit as claimed in claim 5, wherein said image detector means comprises:

integrator means for providing an integrated signal by integrating said sampled signal in dependence upon a vertical synchronizing signal;

inverter means for providing an inverted signal by inverting said integrated signal;

comparator means for providing a compared signal by comparing said inverted signal with a reference voltage signal;

means for grounding said compared signal in dependence upon a vertical blanking signal; and flip-flop means for providing said shutter adjusting signal representative of said one of said high logic state and said low logic state by delaying said compared signal by one-half of a period of said vertical synchronizing signal.

* * * * *

UNITED STATES PATENT AND TRADEMARK OFFICE
CERTIFICATE OF CORRECTION

PATENT NO. : 5,249,057
DATED : 9/28/93
INVENTOR(S) : Il-Hoong Jeon

It is certified that error appears in the above-indentified patent and that said Letters Patent is hereby corrected as shown below:

On the title page, item [57] Abstract, line 12, change "detection for detector" to --detector for detecting--.

Column 1, line 16, change "camera" to --cameras--(both occurrences).

Column 2, line 53, change "SW 3" to --SW 4--.

Column 3, line 26, change "in the direction" to --in a closing direction--; line 49, change "received" to --receive--.

Column 4, line 39, after "1.4 F", insert --(aperture--.

Signed and Sealed this

Eleventh Day of October, 1994

Attest:

BRUCE LEHMAN

Attesting Officer      Commissioner of Patents and Trademarks